United States Patent
Kim et al.

(10) Patent No.: US 9,776,237 B1
(45) Date of Patent: Oct. 3, 2017

(54) APPARATUS FOR MOUNTING BLIND RIVET

(71) Applicant: Hyundai Motor Company, Seoul (KR)

(72) Inventors: Min Soo Kim, Suwon-si (KR); Chang Dong Kim, Suwon-si (KR); Jun Hyoung Kim, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/365,868

(22) Filed: Nov. 30, 2016

(30) Foreign Application Priority Data

Apr. 5, 2016 (KR) .......................... 10-2016-0041534

(51) Int. Cl.
*B21J 15/34* (2006.01)
*B21J 15/10* (2006.01)
*B21J 15/04* (2006.01)
*B21J 15/32* (2006.01)

(52) U.S. Cl.
CPC .............. *B21J 15/10* (2013.01); *B21J 15/043* (2013.01); *B21J 15/105* (2013.01); *B21J 15/326* (2013.01)

(58) Field of Classification Search
CPC ........ B21J 15/10; B21J 15/105; B21J 15/326; B21J 15/043
USPC .................................................... 29/243.525
See application file for complete search history.

(56) References Cited

U.S. PATENT DOCUMENTS

| | | | | | |
|---|---|---|---|---|---|
| 5,351,379 | A | * | 10/1994 | Chu | B21J 15/043 29/243.525 |
| 5,519,927 | A | * | 5/1996 | Roessler | B21J 15/20 29/243.523 |
| 8,677,588 | B2 | * | 3/2014 | Soller | B21J 15/043 29/243.521 |
| 8,925,166 | B2 | * | 1/2015 | Erni | B21J 15/043 29/243.521 |

FOREIGN PATENT DOCUMENTS

| | | |
|---|---|---|
| JP | S61-249639 A | 11/1986 |
| KR | 10-2013-0056890 A | 5/2013 |
| KR | 10-2013-0056891 A | 5/2013 |
| KR | 10-2015-0036616 A | 4/2015 |
| WO | WO 2012/025519 A1 | 3/2012 |
| WO | WO 2012/025522 A2 | 3/2012 |
| WO | WO 2014/009753 A1 | 1/2014 |

\* cited by examiner

*Primary Examiner* — David B Jones
(74) *Attorney, Agent, or Firm* — Morgan, Lewis & Bockius LLP

(57) ABSTRACT

An apparatus for mounting a blind rivet, configured to mount the blind rivet having a rivet body and a mandrel on a board, may include a rivet holder accommodating a mandrel therein and pressing a rivet head towards the board, a mandrel holder positioned inside the rivet holder and moving separately from the rivet holder to hold and pull the accommodated mandrel, and an impactor positioned inside the rivet holder to accommodate the mandrel holder therein and applying pressure to the mandrel holder holding the mandrel, thus lifting the mandrel holder together with the mandrel.

9 Claims, 8 Drawing Sheets

APPARATUS FOR MOUNTING BLIND RIVET

CROSS REFERENCE TO RELATED APPLICATION

The present application claims priority of Korean Patent Application No. 10-2016-0041534 filed on Apr. 5, 2016, the entire contents of which is incorporated herein for all purposes by this reference.

BACKGROUND OF THE INVENTION

Field of the Invention

Various embodiments of the present invention relates to an apparatus for mounting a blind rivet, which applies uniform pressure to a mandrel holder holding a mandrel in a rivet holder using an impactor, thus preventing the mandrel from becoming eccentric when it is separated.

Description of Related Art

A conventional apparatus for mounting a blind rivet generates a moment by an angle of a fracture surface of a groove formed in a mandrel according a load that is non-uniformly applied when the mandrel is cut in the state where the apparatus comes into close contact with a rivet head. Further, the moment is generated by a twisted phenomenon resulting from the bending deformation of the mandrel itself. Therefore, in the case of mounting the rivet on a board including a composite layer composed of reinforced fiber and resin, the eccentricity phenomenon of the mandrel generates a crack in the composite layer and increases a gap between layers.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for mounting a blind rivet, which applies uniform pressure to a mandrel holder holding a mandrel in a rivet holder using an impactor, thus preventing the mandrel from becoming eccentric when it is separated.

According to one aspect, there is provided an apparatus for mounting a blind rivet, configured to mount the blind rivet having a rivet body and a mandrel on a board, the apparatus including a rivet holder accommodating a mandrel therein and pressing a rivet head towards the board; a mandrel holder positioned inside the rivet holder and moving separately from the rivet holder to hold and pull the accommodated mandrel; and an impactor positioned inside the rivet holder to accommodate the mandrel holder therein, and applying pressure to the mandrel holder holding the mandrel, thus lifting the mandrel holder together with the mandrel.

The rivet holder may include an accommodating part accommodating the impactor in a space formed therein; and a first pressing part formed on a lower end of the accommodating part, having a central recess formed in a shape corresponding to the rivet head, with a through hole formed in the central recess, thus simultaneously pressing the board and the rivet head down while accommodating the mandrel therein.

The mandrel holder may include a holding part including a plurality of pieces that are spaced apart from each other, and moving horizontally to cause the plurality of pieces to come near to each other, so that an inside surface of the holding part is in surface contact with an outside surface of the mandrel; and a pressed part formed on a lower end of the holding part, and subjected to pressure applied by the impactor.

The mandrel holder may be configured such that a thickness from an inside surface to an outside surface thereof may be gradually reduced in a direction from a lower portion of the holding part to the pressed part.

When viewed from a section taken in a longitudinal direction of the rivet holder, the mandrel holder and the impactor, the impactor may be positioned between the rivet holder and the mandrel holder.

The impactor may include a space defining part that accommodates the mandrel holder therein and defines a space in which the holding part is movable horizontally.

The impactor may further include a second pressing part bent to be reduced in width in a longitudinal direction of the space defining part, with an upper surface of an end of the second pressing part facing a lower surface of the pressed part.

The apparatus may further include a damper attached to either of a part of the impactor applying pressure to the mandrel holder or a part of the mandrel holder subjected to pressure.

The impactor may momentarily apply pressure to an entire lower end of the mandrel holder under a condition that the mandrel head may be fitted into the rivet body by an upward movement of the mandrel holder holding the mandrel, thus allowing the mandrel to be separated into the mandrel head and the mandrel body.

Under a condition that the mandrel holder may hold the mandrel, the impactor may continuously applies uniform pressure to an entire lower end of the mandrel holder, thus causing the mandrel fitted into the rivet body to be separated into the mandrel head and the mandrel body.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
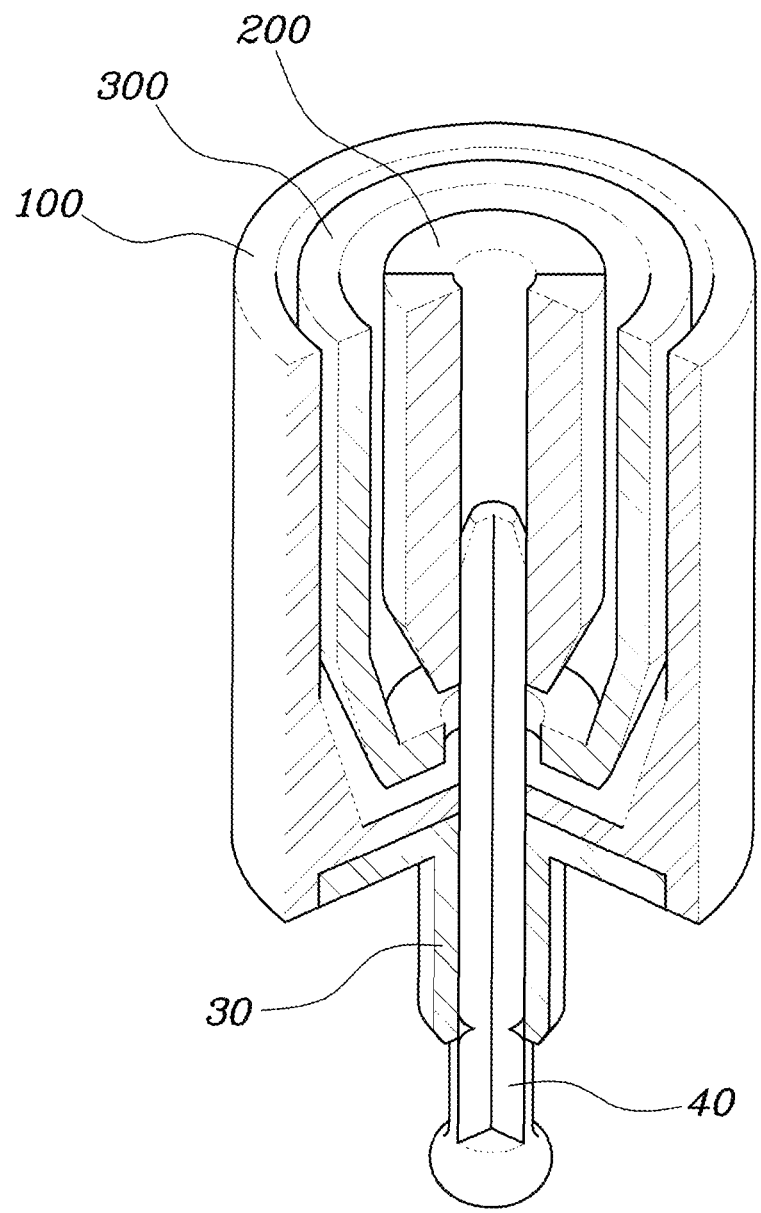
FIG. 1 is a view illustrating an apparatus for mounting a blind rivet according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, exemplary embodiments of the present invention will be described in detail with reference to the accompanying drawings.

As illustrated in FIG. 1, an apparatus for mounting a blind rivet configured to mount a blind rivet having a rivet 30 and a mandrel 40 on a board 10, according to an exemplary embodiment of the present invention, includes a rivet holder 100, a mandrel holder 200, and an impactor 300. The rivet holder accommodates the mandrel 40 therein and presses a rivet head 32 towards the board 10. The mandrel holder is positioned inside the rivet holder 100, and moves separately from the rivet holder 100 to hold and pull the accommodated mandrel 40. The impactor is positioned inside the rivet holder 100 to accommodate the mandrel holder 200, and applies pressure to the mandrel holder 200 holding the mandrel 40, thus lifting the mandrel holder 200 together with the mandrel 40.

Figure 2:
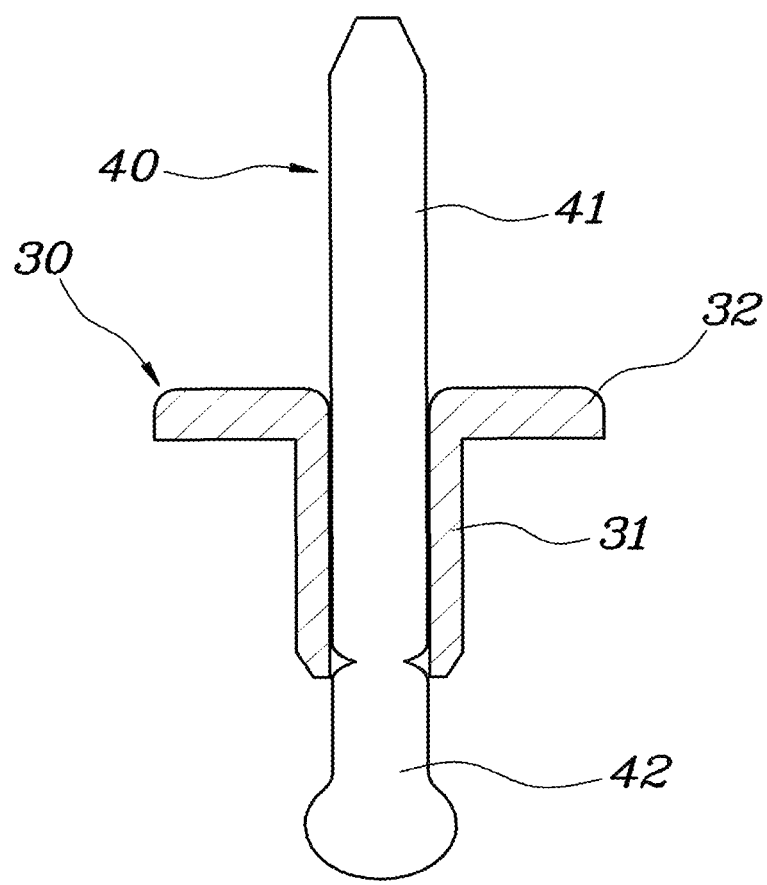
FIG. 2 is a view illustrating a blind rivet according to an exemplary embodiment of the present invention.

Generally, as illustrated in FIG. 2, the rivet 30 constituting the blind rivet has upper and lower holes, and is divided into a cylindrical rivet body 31 through which the upper and lower holes simultaneously pass, and a circular flange-shaped rivet head 32 which is bent perpendicularly from an upper end of the rivet body 31.

Further, the mandrel 40 constituting the blind rivet is divided into a mandrel body 41 and a mandrel head 42. The mandrel body has a predetermined cross-sectional area, and passes through a through hole of the rivet body 31. The mandrel head does not pass through the upper and lower holes of the rivet body 31 based on a groove that is smaller in cross-sectional area than the mandrel body 41, and is larger in cross-sectional area than the upper and lower holes to be stopped by the lower hole of the rivet body 31.

Figure 3:
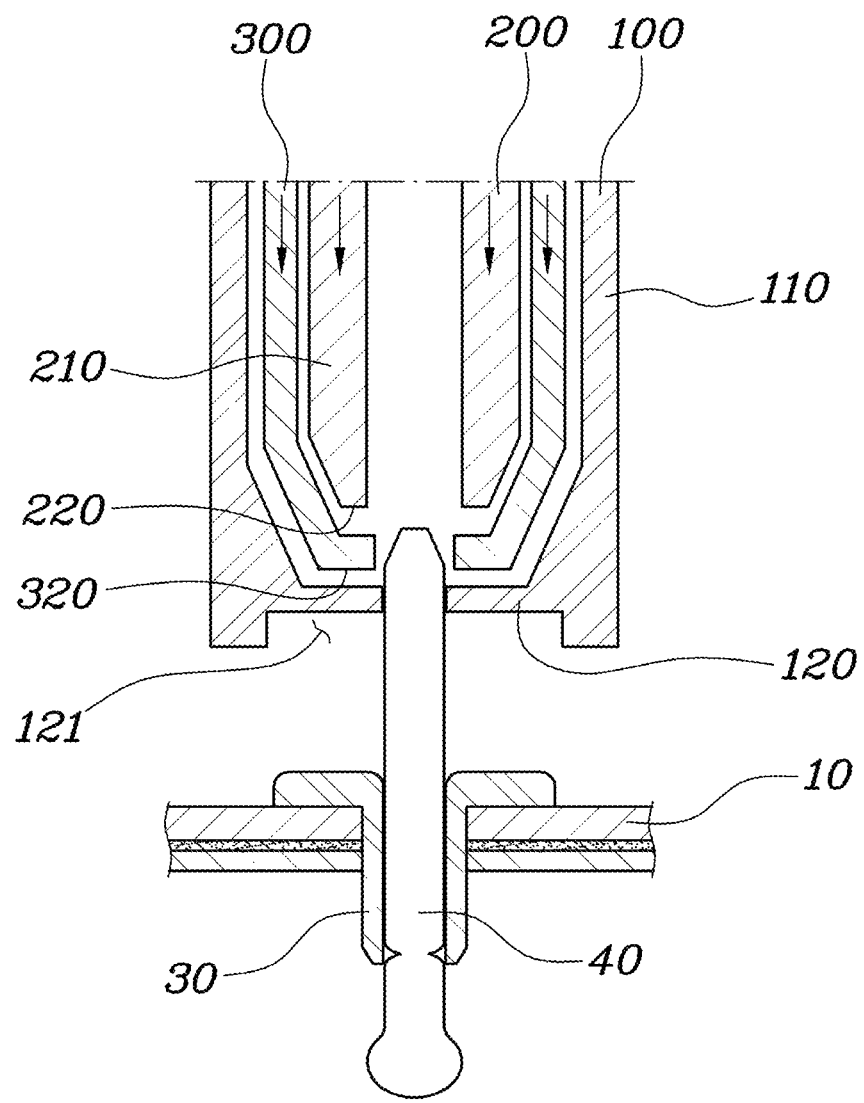
FIG. 3 is a view illustrating the apparatus for mounting the blind rivet according to the exemplary embodiment of the present invention.

As illustrated in FIG. 3, a space is defined in the rivet holder 100. Further, a hole is formed in a lower end in a longitudinal direction thereof to allow the mandrel 40 to be inserted therein. Portions other than the portion in which the hole is formed may press the rivet head 32 towards the board 10 and then insert the rivet body 31 into the board 10.

Figure 4:
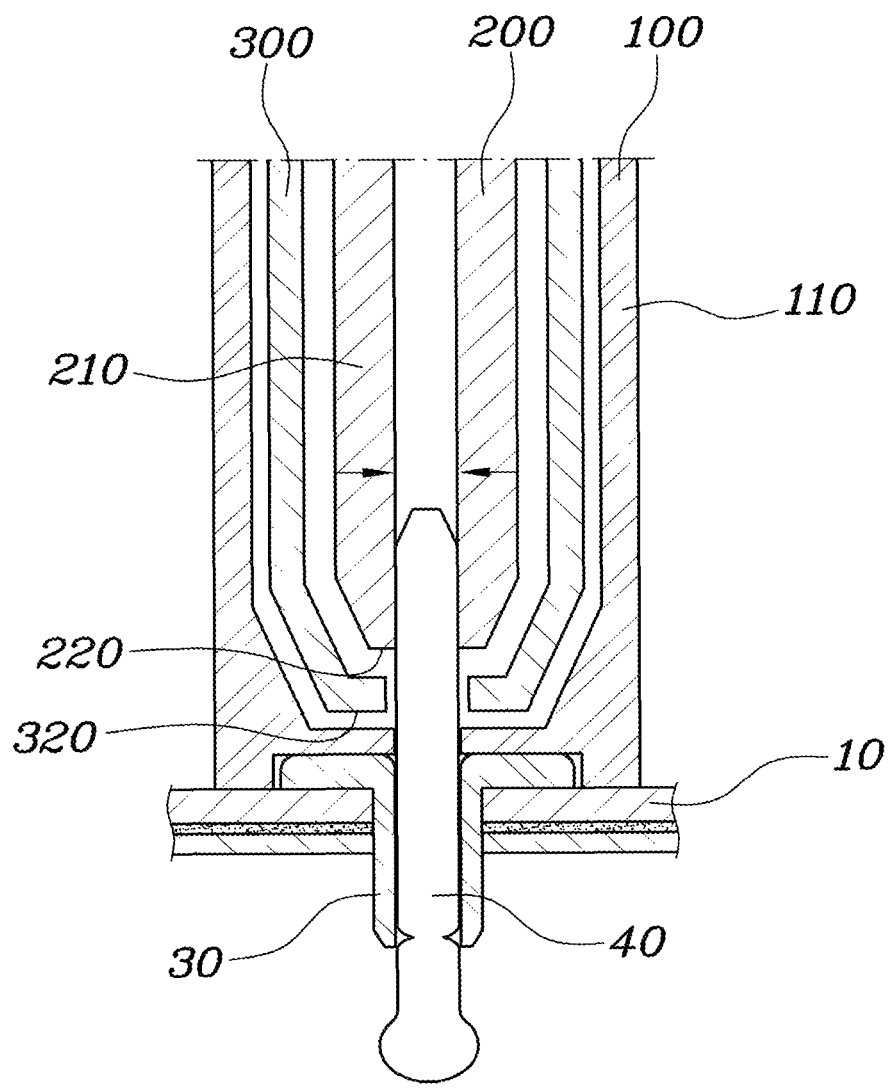
FIG. 4 is a view illustrating an operation of a mandrel holder according to an exemplary embodiment of the present invention.
Figure 5:
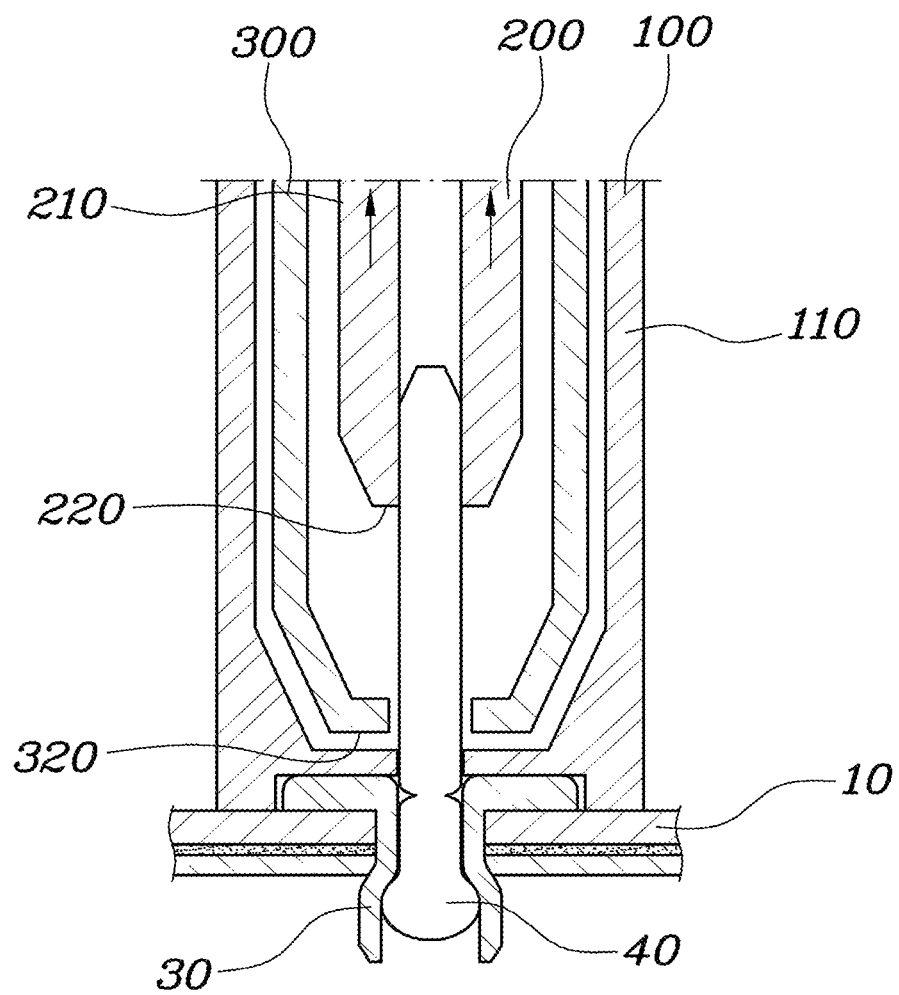
FIG. 5 is a view illustrating an operation of the mandrel holder according to the exemplary embodiment of the present invention.

As illustrated in FIG. 4 and FIG. 5, the mandrel holder 200 is positioned inside the rivet holder 100. The mandrel holder 200 serves to hold the mandrel 40 and pull it upwards. As the mandrel holder 200 holds and pulls the mandrel 40, the mandrel is fitted into the rivet body 31 while the mandrel head 42 deforms the lower hole of the rivet body 31 that is smaller in cross-sectional area than the mandrel head 42.

As described above, the mandrel holder 200 may be moved in a vertical direction to hold and pull the mandrel 40, and may be moved in a horizontal direction to hold the mandrel 40 after the mandrel 40 accommodated in the rivet holder 100 is received again.

Since the mandrel holder 200 may move in the vertical direction separately from the rivet holder 100, the rivet holder 100 presses the rivet head 32 towards the board 10 and simultaneously the mandrel holder 200 moves upwards while holding the mandrel 40, thus allowing the mandrel 40 to be smoothly fitted into the rivet body 31.

The impactor 300 is arranged inside the rivet holder 100 to accommodate the mandrel holder 200 therein. Therefore, when viewed from a section taken in a longitudinal direction of the rivet holder 100, the mandrel holder 200 and the impactor 300, the impactor 300 is positioned between the rivet holder 100 and the mandrel holder 200.

Figure 6:
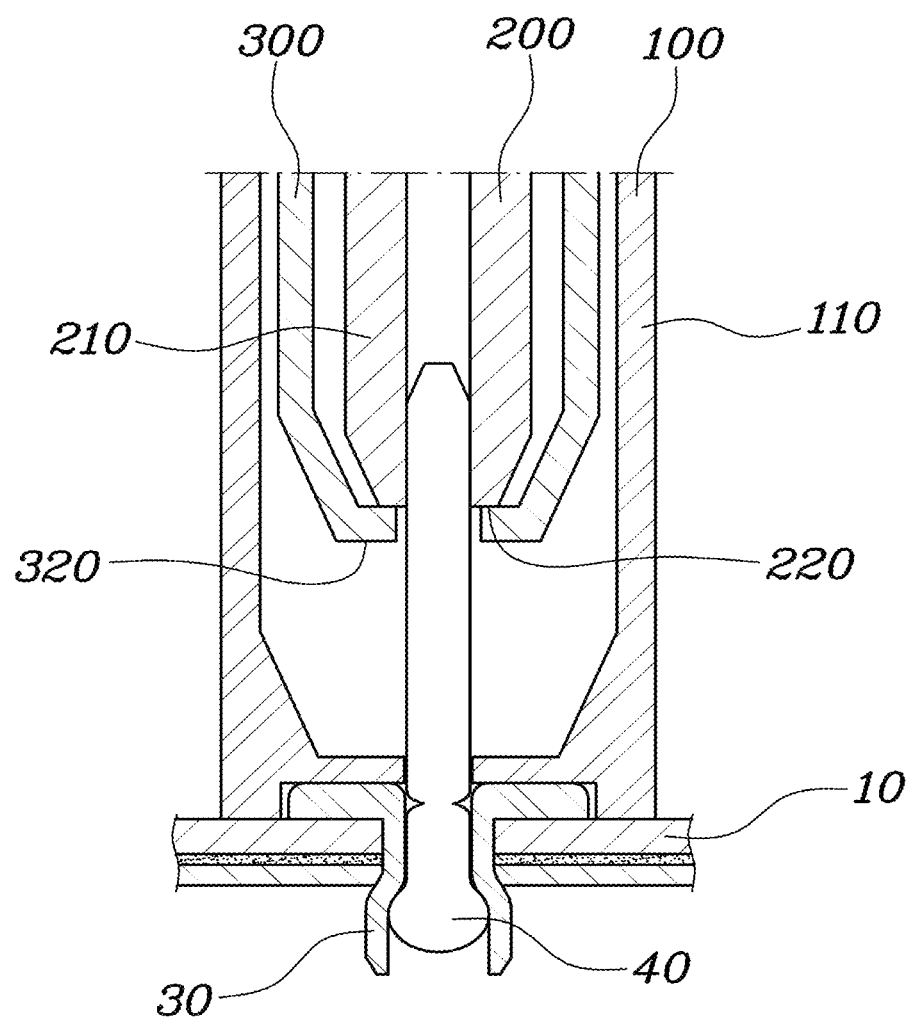
FIG. 6 is a view illustrating an operation of an impactor according to an exemplary embodiment of the present invention.

As illustrated in FIG. 6, the impactor 300 may move in the vertical direction separately from the rivet holder 100 and the mandrel holder 200. Therefore, in the state where the rivet holder 100 presses the rivet head 32 downwards and the mandrel holder 200 holds the mandrel 40, the impactor 300 moves upwards, thus pressing the mandrel holder 200 and lifting the mandrel holder 200 that holds the mandrel 40.

Figure 7:
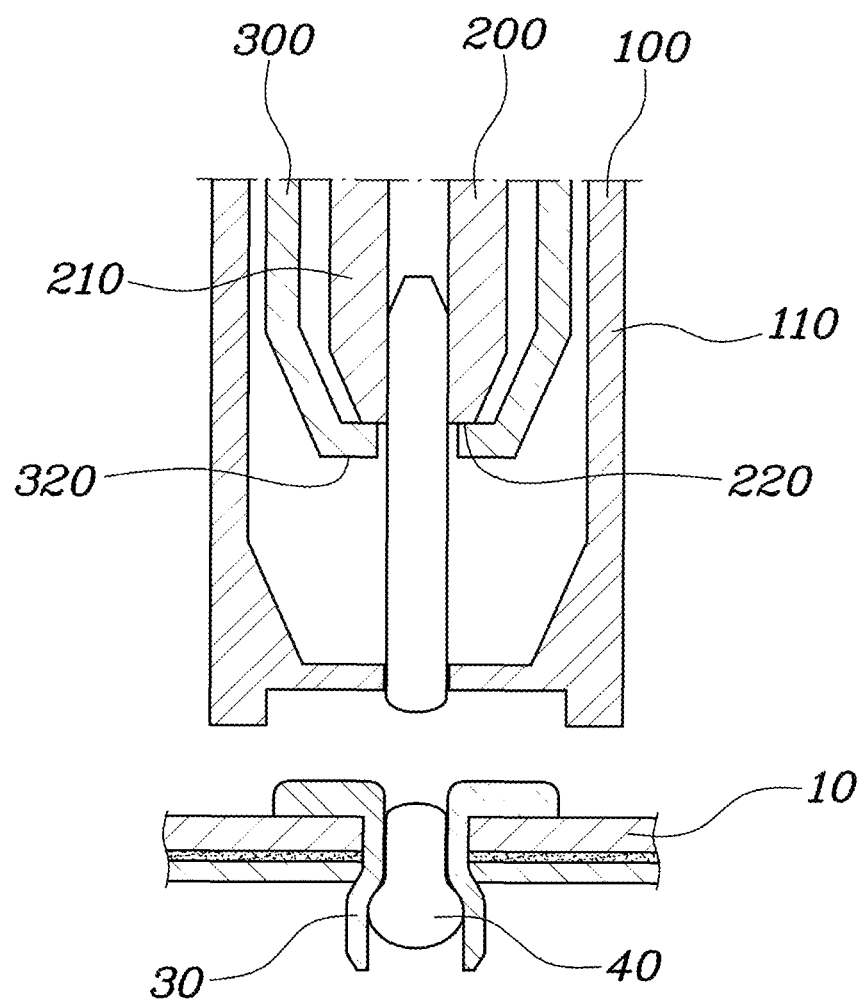
FIG. 7 is a view illustrating an operation of the impactor according to the exemplary embodiment of the present invention.

As illustrated in FIG. 7, as the mandrel holder 200 lifts, fracture is guided from the groove formed in the mandrel 40, so that only the mandrel body 41 is separated in the state where the mandrel head 42 is fitted into the rivet body 31.

The apparatus for mounting the blind rivet according to an exemplary embodiment of the present invention may be operated as follows: after the mandrel head 42 is fitted into the rivet body 31 by the upward movement of the mandrel holder 200 holding the mandrel 40, the impactor 300 momentarily presses the mandrel holder 200, so that the mandrel head 42 and the mandrel body 41 are separated from each other based on the groove, and the blind rivet is mounted to the board 10.

Further, the impactor 300 lifts the mandrel holder 200 holding the mandrel 40 upwards so that the mandrel head 42 is fitted into the rivet body 31, then the mandrel head 42 and the mandrel body 41 are separated from each other based on the groove, and the blind rivet is mounted to the board 10.

Since the entire lower end of the mandrel holder 200 may be uniformly pressed by the vertical movement of the impactor 300, the generation of the moment by the angle of the fracture surface of the groove formed in the mandrel 40 due to load that is non-uniformly applied when the mandrel 40 is cut, and the generation of the moment by the twisted phenomenon due to the bending deformation of the mandrel 40 itself are suppressed, thus preventing the mandrel head 42 from being eccentric.

Unlike the related art, even if the blind rivet is mounted to the board 10 made by combining a composite layer including a reinforced fiber and resin with a metallic layer, or to the board 10 including only the composite layer, it is possible to prevent a reinforced fiber of the board 10 from being damaged and to cut the mandrel 40 without eccentricity, thus preventing a gap between the layers of the board 10 from being increased and preventing cracks from occurring.

Further, it is possible to expect the effect of hardening the composite layer and the metallic layer attached to the composite layer via an adhesive due to the repeated hitting of the impactor 300, in addition to mitigating stress concentration on the composite layer.

In the apparatus for mounting the blind rivet according to an exemplary embodiment of the present invention, as illustrated in FIG. 3, the rivet holder 100 may include an accommodating part 110 that accommodates the impactor 300 in a space formed therein, and a first pressing part 120 that is formed on a lower end of the accommodating part 110, is provided with a central recess formed in a shape corresponding to the rivet head 32, has a through hole in the central recess, and simultaneously presses the board 10 and the rivet head 32 down while accommodating the mandrel 40 therein.

The accommodating part 110 has a cylindrical shape and has a space to accommodate the impactor 300 therein. Further, the first pressing part 120 is formed on the lower end of the accommodating part 110 to delimit an internal space. A central recess 121 is formed in a central portion of the first pressing part 120 to be indented towards the internal space. Preferably, since the central recess 121 is indented to correspond to the rivet head 32 and the through hole is formed in a central portion of the central recess 121 to allow the mandrel 40 to be inserted, the rivet holder 100 may simultaneously press the board 10 and the rivet head 32 down while receiving the mandrel 40 therein.

In the case where the central recess 121 is not provided, the imbalance of the load may occur in a process where the mandrel holder 200 holds and pulls the mandrel 40 while the first pressing part 120 presses the rivet head 32 or in a process where the impactor 300 applies pressure to the mandrel holder 200 holding the mandrel 40.

The central recess formed in the shape corresponding to that of the rivet head 32 allows the rivet head 32 and the board 10 to be simultaneously pressed, thus causing the rivet holder 100 to be stably positioned. Therefore, the operation of the impactor 300 causes the mandrel 40 to be separated, thus preventing the eccentricity of the mandrel.

Meanwhile, in the apparatus for mounting the blind rivet according to an exemplary embodiment of the present invention, as illustrated in FIG. 4, the mandrel holder 200 includes a holding part 210 and a pressed part 220. The holding part includes a plurality of pieces that are spaced apart from each other, moves horizontally to cause the plurality of pieces to come near to each other, so that an inside surface of the holding part is in surface contact with an outside surface of the mandrel 40. The pressed part 220 is formed on a lower end of the holding part 210, and is subjected to pressure applied by the impactor 300.

The mandrel holder 200 may move in the impactor 300 to hold the mandrel 40. Thus, the holding part 210 holding the mandrel 40 includes the plurality of pieces to be movable vertically and horizontally. The holding part moves downwards in the vertical direction until the mandrel 40 is positioned between the plurality of pieces, and then moves horizontally so that the plurality of pieces come near to each other, thus holding the mandrel 40.

In this regard, the inside surfaces of the plurality of pieces coming into contact with the mandrel 40 are formed in a curved shape to correspond to an outside surface of the mandrel 40, so that the inside surfaces contact with an outside surface of the mandrel 40 when the holding part 210 holds the mandrel 40, thus allowing the mandrel 40 to be pulled up without being missed.

Preferably, to prevent the mandrel 40 from being removed from the holding part 210, corresponding uneven structures may be formed on the inside surface of the holding part 210 and an outside surface of the mandrel 40.

Since the pressed part 220 is formed on the lower end of the holding part 210 to be subjected to the pressure, uniform load is transmitted to the mandrel holder 200 when the mandrel holder 200 is pressed by the upward movement of the impactor 300.

the mandrel holder is configured such that a thickness from the inside surface to an outside surface is reduced in a direction from a lower portion of the holding part 210 to the pressed part 220, thus causing the load generated by the pressing of the impactor 300 to be concentrated on the pressed part 220, and preventing the mandrel 40 from being eccentric.

In the apparatus for mounting the blind rivet according to an exemplary embodiment of the present invention, as illustrated in FIG. 6, the impactor 300 may include a space defining part 310 that accommodates the mandrel holder 200 therein and defines a space in which the holding part 210 is movable horizontally, and a second pressing part 320 that is bent to be gradually reduced in width in a longitudinal direction of the space defining part 310. An upper surface of an end of the second pressing part 320 faces a lower surface of the pressed part 220.

The space defining part 310 defines the space that accommodates the mandrel holder 200 therein and allows the holding part 210 of the mandrel holder 200 to move horizontally and hold the mandrel 40. The space defining part 310 may move vertically to press and lift the mandrel holder 200 holding the mandrel 40.

The second pressing part 320 is formed on a lower portion of the space defining part 310, and is configured to be closed such that ends in a longitudinal direction of the space defining part 310 come near to each other. When the ends of the second pressing part 320 approach each other, the upper surfaces of the ends face the pressed part 220. Therefore, it is possible to press the pressed part 220 of the mandrel holder 200 holding the mandrel 40 with uniform load.

Therefore, the mandrel simultaneously contacts with the entire second pressing part 320 and the entire pressed part 220 to apply pressure to the pressed part 220 with the uniform load.

Figure 8:
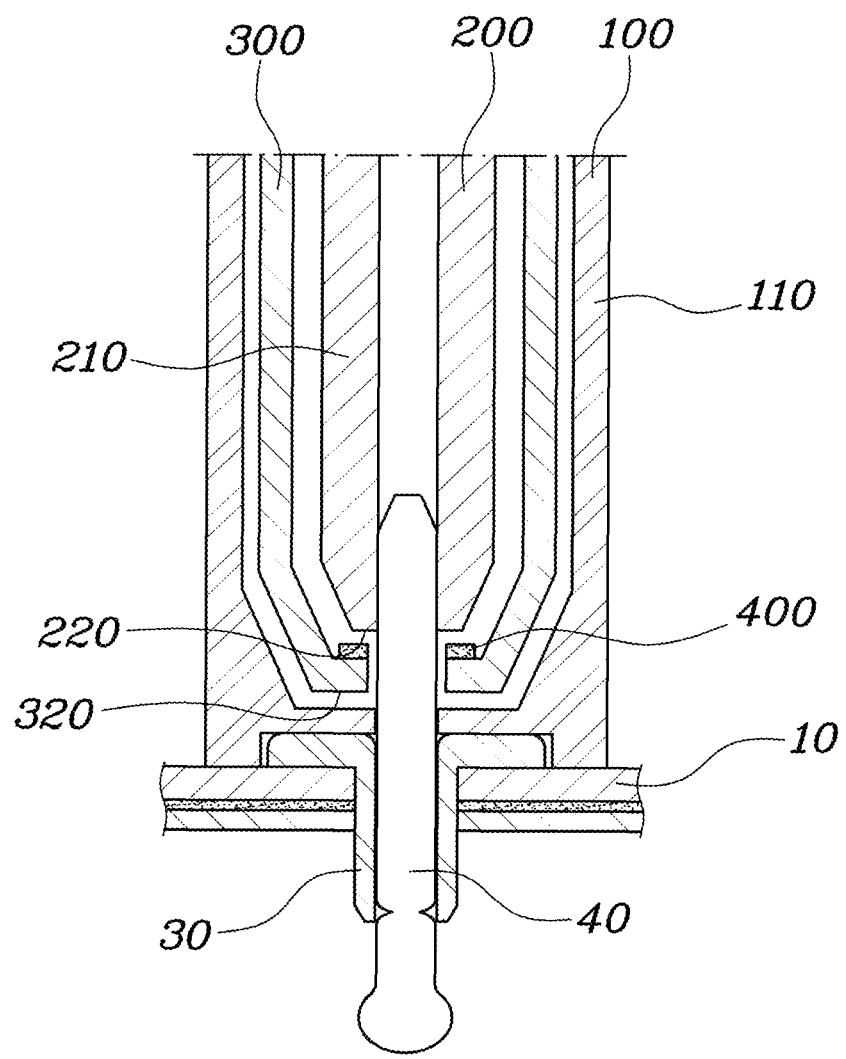
FIG. 8 is a view illustrating the apparatus for mounting the blind rivet according to the exemplary embodiment of the present invention.

As illustrated in FIG. 8, the apparatus for mounting the blind rivet according to an exemplary embodiment of the present invention may further include a damper 400 that is attached to either of a part of the impactor 300 applying pressure to the mandrel holder 200 or a part of the mandrel holder 200 subjected to pressure.

The damper 400 includes an elastic material including rubber, and is attached to the part of the impactor 300 applying pressure to the mandrel holder 200 or the part of the mandrel holder 200 subjected to pressure, preferably, to the second pressing part 320 or the pressed part 220, thus preventing the impactor 300 and the mandrel holder 200 from being damaged when the impactor 300 applies the pressure.

The apparatus for mounting the blind rivet according to an exemplary embodiment of the present invention causes the impactor 300 to momentarily apply pressure to the entire lower end of the mandrel holder 200 under the condition that the mandrel head 42 is fitted into the rivet body 31 by the upward movement of the mandrel holder 200 holding the mandrel 40, thus allowing the mandrel 40 to be separated into the mandrel head 42 and the mandrel body 41.

Alternatively, under the condition that the mandrel holder 200 holds the mandrel 40, the impactor 300 continuously applies uniform pressure to the entire lower end of the mandrel holder 200, thus causing the mandrel 40 to be fitted into the rivet body 31 and then be separated into the mandrel head 42 and the mandrel body 41.

As having described, various aspects of the present invention are directed to providing an apparatus for mounting a blind rivet, which applies uniform pressure to a mandrel holder holding a mandrel in a rivet holder using an impactor, thus preventing the mandrel from becoming eccentric when it is separated.

Further, even when a blind rivet is mounted on a board including a composite layer composed of reinforced fiber and resin, a mandrel may be cut by upward movement, thus preventing a crack of the composite layer from being generated and preventing a gap between layers from being increased. Owing to the minimization of a mandrel length, the cost of a blind rivet may be reduced.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for mounting a blind rivet, configured to mount the blind rivet having a rivet body and a mandrel on a board, the apparatus comprising:
   a rivet holder accommodating a mandrel therein and pressing a rivet head towards the board;
   a mandrel holder positioned inside the rivet holder and moving separately from the rivet holder to hold and pull the accommodated mandrel;
   an impactor positioned inside the rivet holder to accommodate the mandrel holder therein, and applying pressure to the mandrel holder holding the mandrel, thus lifting the mandrel holder together with the mandrel; and
   a damper attached to either of a part of the impactor applying pressure to the mandrel holder or a part of the mandrel holder subjected to pressure.

2. The apparatus according to claim 1, wherein the rivet holder comprises:
   an accommodating part accommodating the impactor in a space formed therein; and
   a first pressing part formed on a lower end of the accommodating part, and having a central recess formed in a shape corresponding to the rivet head, with a through hole formed in the central recess, the first pressing part pressing the board and the rivet head down while accommodating the mandrel therein.

3. The apparatus according to claim 1, wherein the mandrel holder includes:
   a holding part including a plurality of pieces that are spaced apart from each other, and moving horizontally to cause the plurality of pieces to come near to each other, so that an inside surface of the holding part is in surface contact with an outside surface of the mandrel; and
   a pressed part formed on a lower end of the holding part, and subjected to pressure applied by the impactor.

4. The apparatus according to claim 3, wherein the mandrel holder is configured such that a thickness from an inside surface to an outside surface thereof is reduced in a direction from a lower portion of the holding part to the pressed part.

5. The apparatus according to claim 1, wherein, based on a section taken along a longitudinal direction of the rivet holder, the mandrel holder and the impactor, the impactor is positioned between the rivet holder and the mandrel holder.

6. The apparatus according to claim 3, wherein the impactor includes:
   a space defining part accommodating the mandrel holder therein, and defining a space in which the holding part is movable horizontally.

7. The apparatus according to claim 6, wherein the impactor further includes:
   a second pressing part bent to be reduced in width in a longitudinal direction of the space defining part so that an upper surface of an end of the second pressing part faces a lower surface of the pressed part.

8. The apparatus according to claim 1, wherein the impactor momentarily applies pressure to an entire lower end of the mandrel holder when the mandrel head is fitted into the rivet body by an upward movement of the mandrel holder holding the mandrel, thus allowing the mandrel to be separated into the mandrel head and the mandrel body.

9. The apparatus according to claim 1, wherein, when the mandrel holder holds the mandrel, the impactor continuously applies uniform pressure to an entire lower end of the mandrel holder, thus causing the mandrel fitted into the rivet body to be separated into the mandrel head and the mandrel body.

* * * * *